(12) United States Patent  
Winter et al.

(10) Patent No.: US 9,167,176 B2  
(45) Date of Patent: Oct. 20, 2015

(54) METHOD AND DEVICE FOR HANDLING MULTIPLE VIDEO STREAMS USING METADATA

(75) Inventors: Marco Winter, Hannover (DE); Dirk Gandolph, Ronnenberg (DE); Hartmut Peters, Barsinghausen (DE); Ralf Ostermann, Hannover (DE); Jobst Hoerentrup, Wennigsen (DE); Andrej Schewzow, Hannover (DE); Uwe Janssen, Seelze (DE)

(73) Assignee: THOMSON LICENSING, Issy les-Moulineaux (FR)

( * ) Notice: Subject to any disclaimer, the term of this patent is extended or adjusted under 35 U.S.C. 154(b) by 456 days.

(21) Appl. No.: 11/988,951

(22) PCT Filed: Jul. 5, 2006

(86) PCT No.: PCT/EP2006/063884  
§ 371 (c)(1),  
(2), (4) Date: Jan. 17, 2008

(87) PCT Pub. No.: WO2007/009876  
PCT Pub. Date: Jan. 25, 2007

(65) Prior Publication Data  
US 2009/0115901 A1 May 7, 2009

(30) Foreign Application Priority Data  
Jul. 18, 2005 (EP) .................................. 05015576

(51) Int. Cl.  
*H04N 7/10* (2006.01)  
*H04N 5/262* (2006.01)  
*H04N 5/272* (2006.01)  
(Continued)

(52) U.S. Cl.  
CPC ............... *H04N 5/262* (2013.01); *H04N 5/272* (2013.01); *H04N 5/44591* (2013.01); *H04N 5/45* (2013.01); *H04N 7/165* (2013.01); *H04N 21/235* (2013.01); *H04N 21/435* (2013.01); *H04N 21/4312* (2013.01); *H04N 21/4314* (2013.01); *H04N 21/6543* (2013.01); *H04N 21/84* (2013.01); *H04N 21/858* (2013.01)

(58) Field of Classification Search  
CPC .......... H04N 21/4312; H04N 21/4314; H04N 21/435; H04N 21/858; H04N 5/272; H04N 5/44591; H04N 5/45; H04N 21/235  
See application file for complete search history.

(56) References Cited

U.S. PATENT DOCUMENTS 6,046,778 A * 4/2000 Nonomura et al. ........... 348/565  
6,952,521 B2 10/2005 Kelly et al.  
(Continued)

FOREIGN PATENT DOCUMENTS

CN 1345159 4/2002  
CN 1381056 11/2002  
(Continued)

OTHER PUBLICATIONS

Search Report Dated Sep. 25, 2006.  
(Continued)

*Primary Examiner* — Rong Le  
(74) *Attorney, Agent, or Firm* — Robert D. Shedd; Jeffrey M. Navon (57) ABSTRACT

A method and device for dynamically overlaying two or more video streams uses specialized metadata that are attached to at least one of the video streams.

16 Claims, 6 Drawing Sheets

(51) Int. Cl.
*H04N 5/445* (2011.01)
*H04N 5/45* (2011.01)
*H04N 7/16* (2011.01)
*H04N 21/235* (2011.01)
*H04N 21/431* (2011.01)
*H04N 21/435* (2011.01)
*H04N 21/6543* (2011.01)
*H04N 21/84* (2011.01)
*H04N 21/858* (2011.01)

(56) References Cited

U.S. PATENT DOCUMENTS

| | | | |
|---|---|---|---|
| 7,154,558 B2 * | 12/2006 | Yui et al. | 348/565 |
| 7,177,872 B2 * | 2/2007 | Schwesig et al. | 1/1 |
| 7,206,029 B2 | 4/2007 | Cohen-Solal | |
| 7,471,872 B2 | 12/2008 | Togita | |
| 7,752,642 B2 * | 7/2010 | Lemmons | 725/32 |
| 7,865,058 B2 | 1/2011 | Kelly et al. | |
| 8,352,977 B2 | 1/2013 | Kato et al. | |
| 2001/0001160 A1 * | 5/2001 | Shoff et al. | 725/51 |
| 2002/0062481 A1 * | 5/2002 | Slaney et al. | 725/42 |
| 2002/0075407 A1 * | 6/2002 | Cohen-Solal | 348/565 |
| 2004/0045026 A1 * | 3/2004 | Baril et al. | 725/59 |
| 2004/0078263 A1 * | 4/2004 | Altieri | 705/14 |
| 2005/0021552 A1 | 1/2005 | Ackley et al. | |
| 2005/0097135 A1 * | 5/2005 | Epperson et al. | 707/104.1 |
| 2005/0166232 A1 * | 7/2005 | Lamkin et al. | 725/43 |
| 2005/0278761 A1 * | 12/2005 | Gonder et al. | 725/95 |
| 2006/0080408 A1 * | 4/2006 | Istvan et al. | 709/219 |
| 2006/0215988 A1 * | 9/2006 | Tol et al. | 386/83 |
| 2007/0291179 A1 * | 12/2007 | Sterling et al. | 348/642 |
| 2008/0305738 A1 * | 12/2008 | Khedouri et al. | 455/3.06 |

FOREIGN PATENT DOCUMENTS

| | | |
|---|---|---|
| CN | 1489865 | 4/2004 |
| CN | 1574049 | 2/2005 |
| CN | 1581971 | 2/2005 |
| EP | 1158788 A1 | 11/2001 |
| EP | 1274236 | 1/2003 |
| JP | 08009287 A | 1/1996 |
| JP | 10240908 A | 9/1998 |
| JP | 2009502067 | 1/1999 |
| JP | 2001128062 A | 5/2001 |
| JP | 2002298149 A | 10/2002 |
| JP | 2004128570 A | 4/2004 |
| JP | 2004172887 A | 6/2004 |
| JP | 2004282137 A | 10/2004 |
| KR | 20020077449 | 10/2002 |
| KR | 20040016688 | 2/2004 |
| KR | 20050061481 | 6/2005 |
| WO | WO0013147 | 3/2000 |
| WO | WO0122739 | 3/2001 |
| WO | WO0210898 | 2/2002 |
| WO | 2004030351 A | 4/2004 |
| WO | WO2007009876 | 1/2007 |

OTHER PUBLICATIONS

Iguchi et al., "Scene Description Language for Video Program Production in Broadcasting Station", Technical Report of the Institute of Electronics, Info and Comm Engineers(IEICE), Japan, Institute of Electronics, Info and Comm Engineers, Jun. 15, 2001, vol. 101, No. 131, pp. 35-42.

Notani et al., "Metadata Standardization for Information Search, 2. Standardization Activities of Metadata on SMPTE", Bulletin of Institute of Image Info and Television Engineers, Japan, Institute of Image Info and Television Engineers, Mar. 20, 2001, vol. 55, No. 3, pp. 332-336.

Brassil et al., "Large-scale personalized video streaming with program insertion proxies", Communications Magazine, IEEE (Volume:42, Issue: 8), Aug. 9, 2004, pp. 104-110.

Liu et al., "Dynamic layering and bandwidth allocation for multisession video broadcasting with general utility functions", INFOCOM 2003. Twenty-Second Annual Joint Conference of the IEEE Computer and Communications. IEEE Societies (Volume:1), Mar. 30-Apr. 3, 2003, pp. 630-640.

Yin et al., "Automatic time stamp extraction system for home videos", Circuits and Systems, 2002. ISCAS 2002. IEEE International Symposium on (Volume:2), May 26, 2002-May 29, 2002, pp. II-73-II-76.

Sripanidkulchai et al., "The feasibility of supporting large-scale live streaming applications with dynamic application end-points", Computer Communication Review, vol. 34, No. 4, Oct. 2004. pp. 107-120.

Aguilera et al., "Matching events in a content-based subscription system", Proceedings of the 18th ACM Symposium on Principles of districuted computing, Dec. 31, 1999.

* cited by examiner

METHOD AND DEVICE FOR HANDLING MULTIPLE VIDEO STREAMS USING METADATA

This application claims the benefit, under 35 U.S.C. §365 of International Application PCT/EP2006/063884, filed Jul. 5, 2006, which was published in accordance with PCT Article 21(2) on Jan. 25, 2007 in English and which claims the benefit of European patent application No. 05015576.1, filed Jul. 18, 2005.

FIELD OF THE INVENTION

This invention describes a method and device for handling multiple video streams. In particular, the method and device are for overlaying two or more video streams dynamically by using special metadata.

BACKGROUND OF THE INVENTION

Playback devices for audio/video (AV) data, usually based on hard-disk drives (HDD) or optical discs, may have different possibilities to access additional data, e.g. Internet access, Universal Serial Bus (USB) interface etc. for downloading additional contents.

Some high-end TV sets provide the possibility to view two or more programs simultaneously by using picture-in-picture (PIP) technique, which however uses different proprietary technical solutions. The way such a TV set presents different video sequences on the same screen is not flexible, but immediately fixed after manufacturing the TV set.

Available PIP techniques work without any help information extracted from the AV content.

SUMMARY OF THE INVENTION

The described available technology for video overlay is not flexible. Therefore the present invention addresses the problem of providing a method and device for overlaying a video sequence to another video sequence (or a static video image) in a more flexible manner, and in particular it provides control possibilities for such video overlay to someone interested in a particular visual appearance of the program, e.g. the program provider, the author of pre-recorded AV contents, the user.

The present invention provides a way to shift the decision how to overlay different video sequences to the presentation time. Therefore the invention changes the static video overlay to a flexible dynamic video overlay processing system. With this change, e.g. the content provider becomes able to control the overlay. That is a main step for dynamically combining video sequences.

The gist of the invention is to add metadata to a video sequence, which metadata contains overlay parameters and can be used for controlling an overlay of this video sequence to another video sequence or to a static image. In principle it is sufficient if a video sequence that is overlaid contains such metadata. In this case the overlay may be independent from the other video sequence or image to which it is overlaid. It is however possible to identify within the video sequence a certain other video sequence or group of video sequences, to which the overlay parameters relate. Further, it is possible to insert overlay metadata to a video sequence that define how another video sequence may be overlaid, e.g. certain areas within the display may be prohibited to overlay for a particular scene.

For the case of collisions, priorities may be defined for single, several or all parameters. E.g. a first video sequence may contain metadata that define a particular scene, e.g. in terms of time stamps, and that further define for this scene a rectangle area of e.g. 20-80% of the display height and 0-100% of the display width that may not be overlaid. A second video sequence may contain metadata defining that, if this sequence is used as an overlay, it should be rendered in a visible frame e.g. at 0-10% of the display width and preferably at 50% of the display height, i.e. central height on the left edge. In this case, it is possible to shift the frame up or down, so that it is displayed outside the prohibited area, because the parameter "50% height" has lower priority than the others. If the prohibited area in the first sequence has also lower priority, i.e. it "should" not be overlaid, the second sequence can be positioned such that both conditions are fulfilled. If the second video sequence is displayed alone, i.e. not as an overlay, these metadata are ignored.

An advantage of the invention is that it may provide various useful features, e.g. one or more video sequences may be moved, scaled, alpha-blended, and/or overlapped over a background video sequence. Alpha-blending is a common technique for smooth transitions between scenes. These features will not need to be statically available, i.e. they may be dynamically downloaded from the Internet or from a flash memory or from additional discs (e.g. updates of recorded movies) etc.

According to the invention, special metadata are provided with the video sequence, describing how to "glue" different (but determined) video sequences together. The metadata format should be standardized, so that different playback devices are able to handle/interpret this kind of metadata. Currently, no such metadata are available.

A playback device according to the invention may interpret appropriate metadata, and it has the HW/SW (e.g. 3D graphic accelerator) to perform according processing for overlapping etc. For metadata coming from the Internet, the device may have the facilities to download such data. For metadata coming from a flash card reader or USB, the device may have appropriate connectors. Further, the device has the facility to store such metadata in an accessible memory area, e.g. local DRAM.

Various possibilities exist for mixing the video sequences and the metadata: The metadata may be interleaved with the AV stream, the metadata may be stored in a separate file or the metadata may be delivered in parallel together with the video stream (e.g. the film director's talking head) for a special movie. In the last case, the delivery contains all necessary additional data for an overlapped playback. Further, there may be different ways to overlap two or more particular video streams. So, more than one metadata set may be available for the same video sequences.

The metadata used by the invention describe how to overlap two or more video sequences on the same video screen. This overlapping may be possible in a broad range, i.e. very flexible. That means the metadata contains e.g. information about geometrical appearance of the display for the overlaid video sequences, the overlap timing, preferably for the video streams relative to each other, which is particularly useful for synchronizing audio streams, special effects metadata, e.g. fade in/out, color changes, visible frames for PIP etc., and stream metadata.

DETAILED DESCRIPTION OF THE INVENTION

Figure 1:
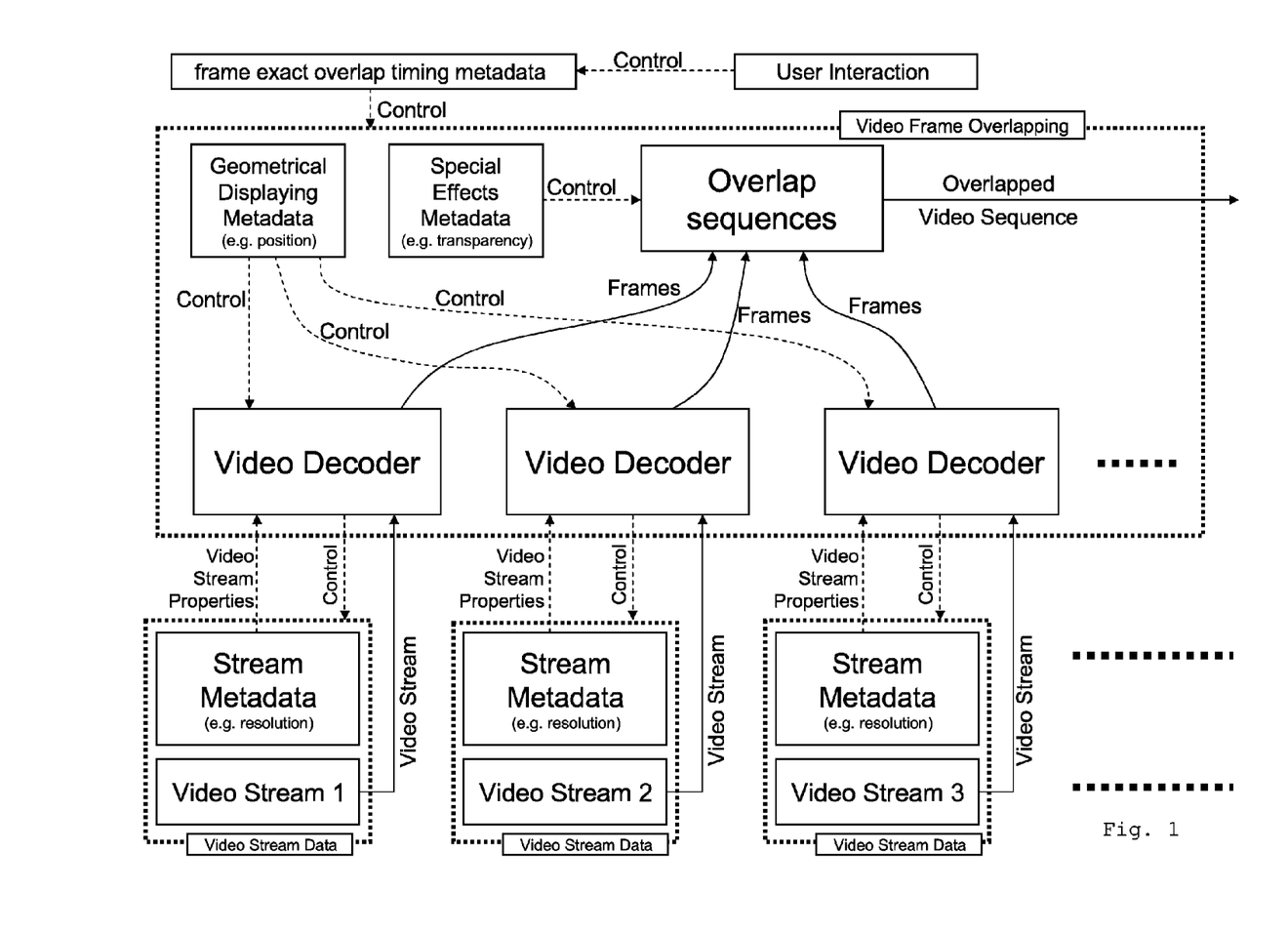

FIG. 1 shows a device for frame overlapping according to the invention, for illustrating how and for which decoding step which kind of metadata is used to perform the dynamic video overlapping. The dashed arrows indicate what kind of metadata is used to perform a specific decoding step. The solid arrows indicate the flow of the video sequence data. The format of the video stream data may change from step to step. E.g. initially the video sequence data is in a compressed format (e.g. MPEG-2, or MPEG-4 or VC-1, etc.), and in the next step it has been decoded into frame buffers (e.g. bitmap like format). The final overlapped video could be in the YUV 4:2:0 format.

Figure 4:
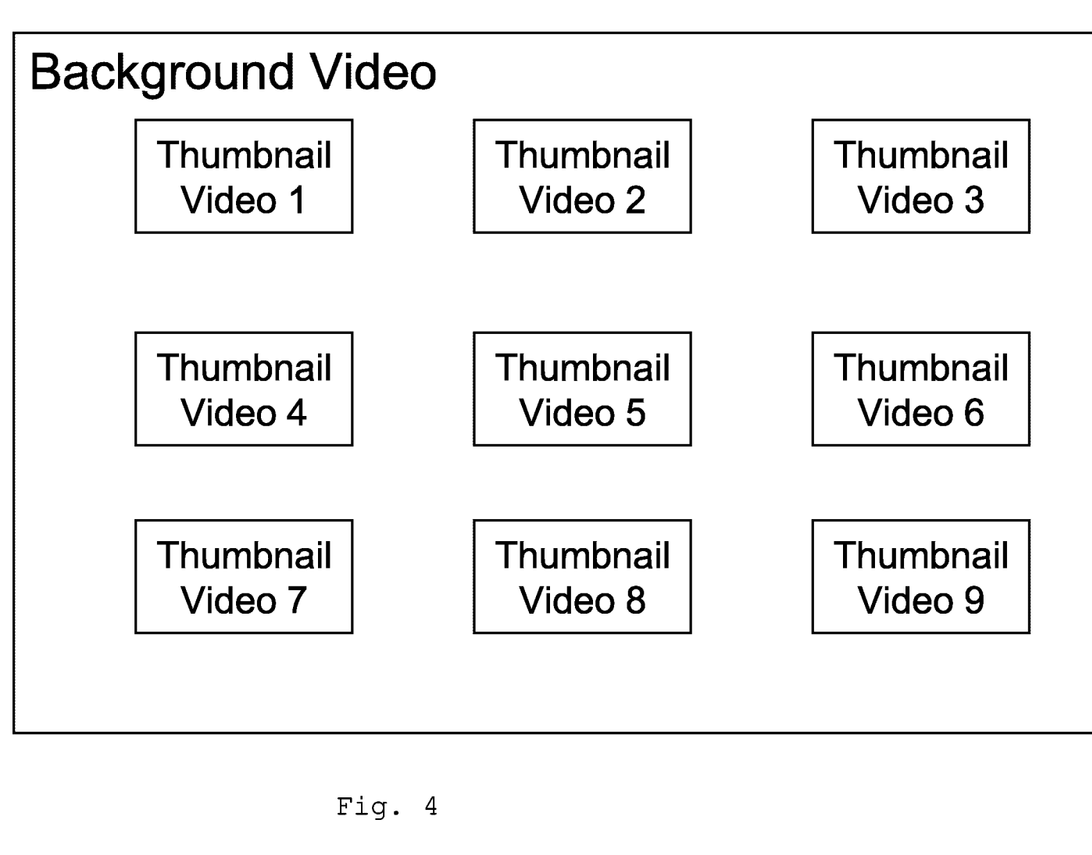
Figure 5:
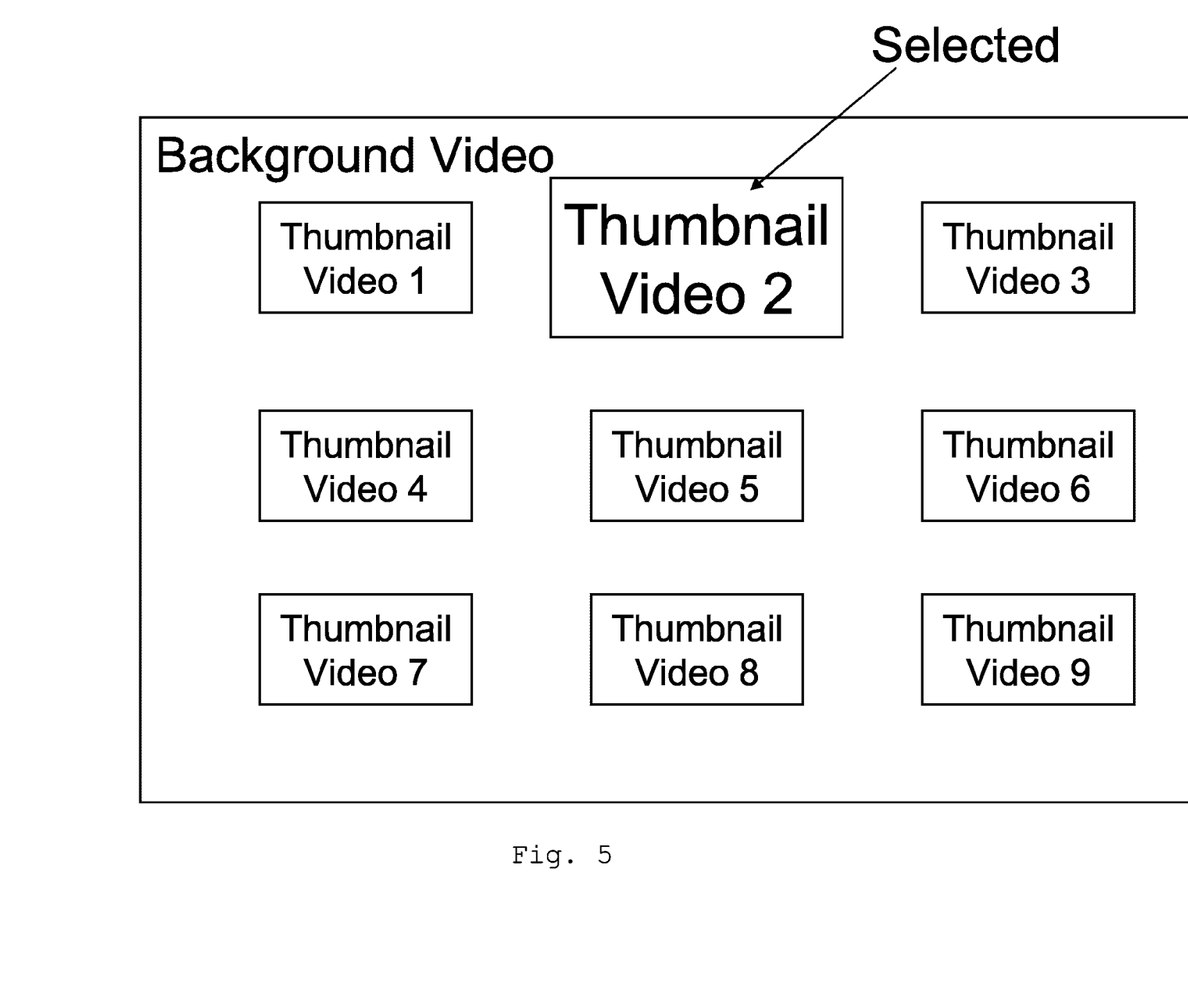
Figure 6:
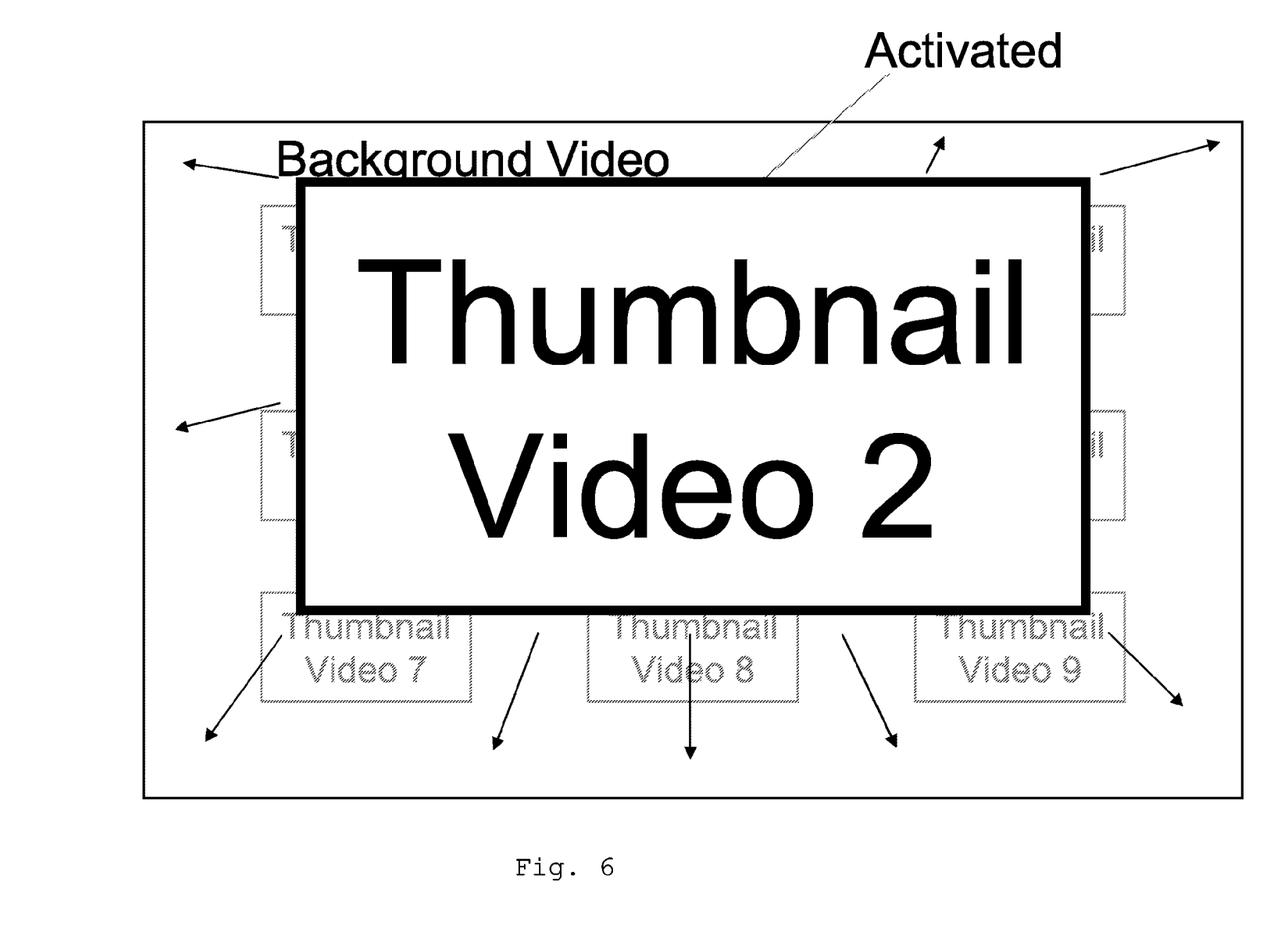

Furthermore, FIG. 1 indicates that a hierarchy is given within the metadata itself. The overlap timing metadata controls the geometrical and the special effects metadata. That is important, because e.g. the position of a sub-video sequence on a screen may change during playback, but not the timing. E.g. the sub-video sequence may move smoothly horizontally, or the whole video frames may be scaled up and/or down. Exemplarily, the screen displays several thumbnail videos of different streams, with one thumbnail video per stream, and the user selects one of these thumbnails using a menu. As special effect, the resolution of this thumbnail video scales up until it covers the whole screen. That would intuitive provide the impression that the selection is related to the immediately following playback of the video in full screen size. This is depicted in FIGS. 4-6.

A further, even upper level of the hierarchy may control the timing metadata. This may be the user interaction. The user may switch between different playback programs, like different program chains (PGCs) as used by DVD. It is like a playlist, i.e. the user may switch to another overlapping program.

Due to the metadata hierarchy, the upper levels may override settings of the lower levels. E.g. a sub-video may be cropped and the pixel aspect ratio may be changed. So, the lower level metadata shall be handled as default data.

Advantageously, if such metadata is stored as separate file, then it should be stored using open document formats like XML. If the metadata is embedded in the video stream itself, then the used format for the embedded metadata must follow the special constraints of the video stream format, e.g. avoid start codes in user_data( ) fields inside MPEG-2 or MPEG-4 video streams.

Figure 2:
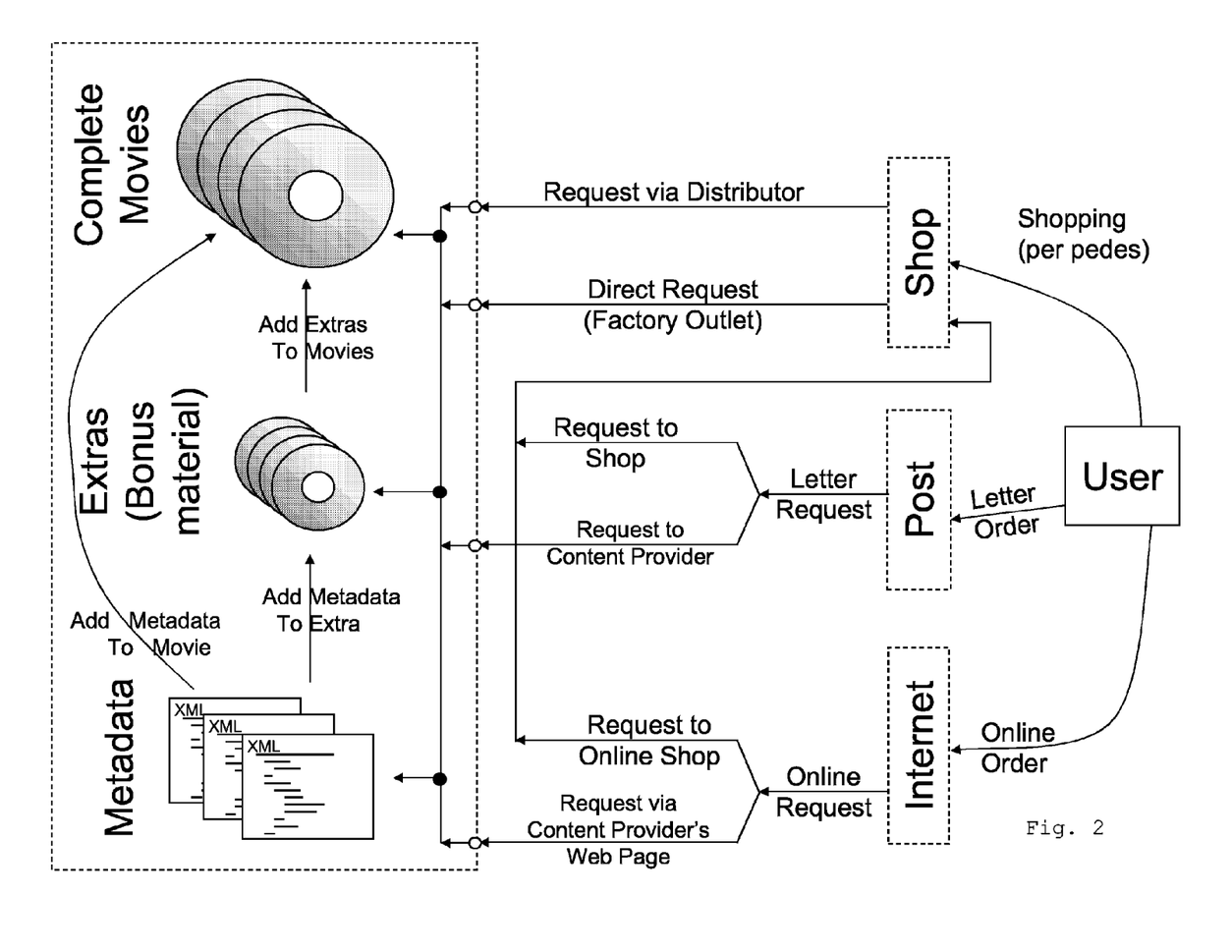
Figure 3:
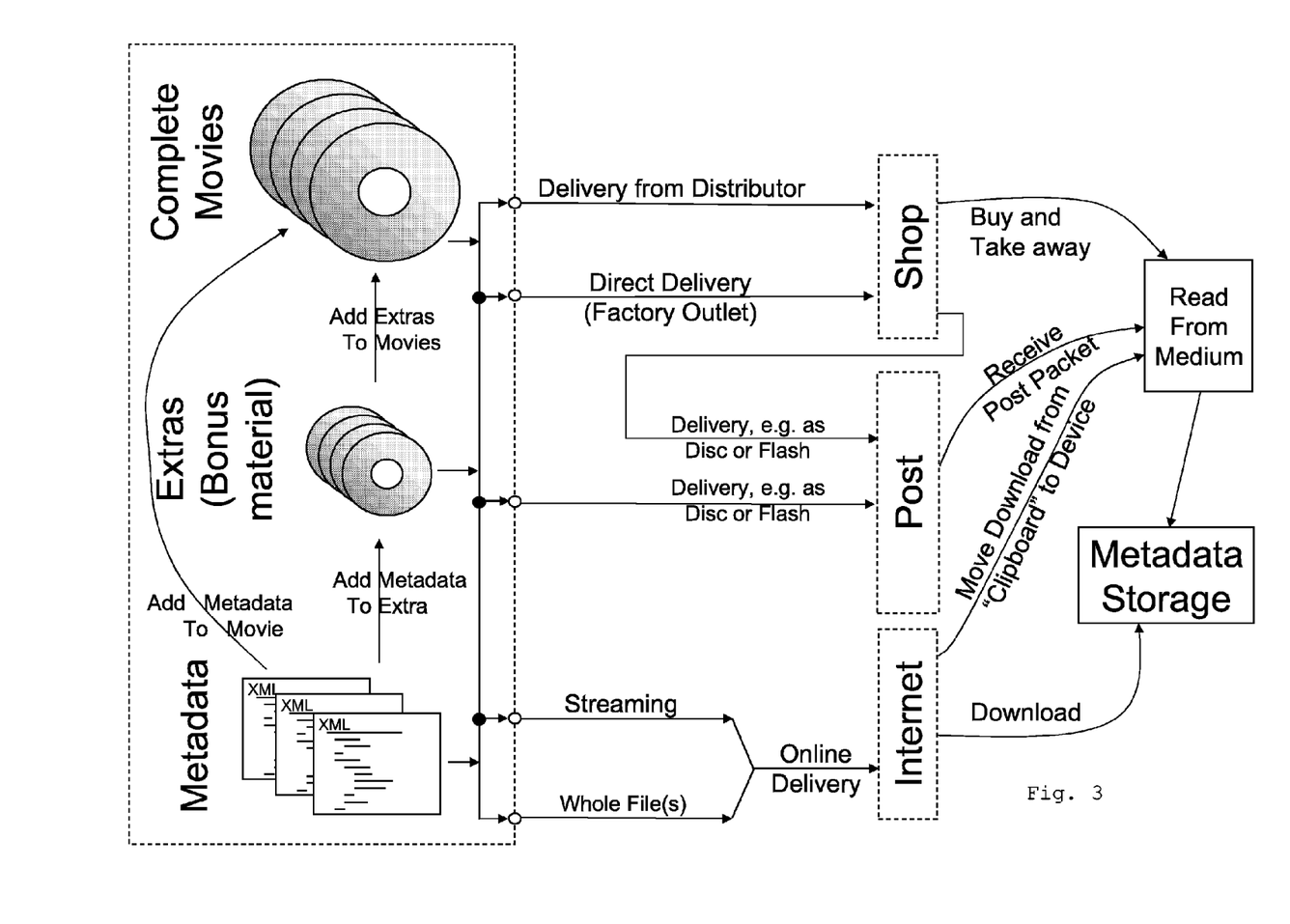

FIGS. 2 and 3 show how a user can separately order a movie disc, extra bonus material (e.g. via Internet) and related metadata. As an example, a user buys a movie as optical disc, opens the cover and sees a voucher for a director's comment video sequence. The user must connect to the content provider's web page (e.g. Disney) and register. After registering on the content provider's web page, the user gets access to the additional director's comment video sequence. The user downloads the video sequence via his DSL connection. After the download is done, the user desires to have a look on its newest downloaded incentive. The user puts the downloaded incentive on a HDD of the playback device. Then, the user starts the playback of the new downloaded video sequence. The playback device recognizes the inserted metadata. So, the playback device knows that the playback of this video sequence is intended in the conjunction with the special movie. If the movie is not yet inserted, then the playback device informs the user (e.g. via UI), that the user shall insert the appropriate disc. When the disc is inserted, then the playback device starts the playback of both video sequences, as defined by the metadata delivered together with the incentive content (e.g. incorporated in the same stream). On the screen is shown the movie, overlapped by the face of the director. The director speaks about the currently shown scene. The incentive video sequence contains a playlist of metadata, i.e. a set of commented parts. So, the user may select one of several commented scene, e.g. a playlist like the following 1. Director comments the whole movie
2. Director comments the stunts
3. Director comments the FX scenes
4. Actor 1 comments the erotic scene
5. Actor 2 comments some funny situations during shooting In this example, two movies are available (original movie and incentive video sequence), and five sets of metadata. Each set combines different parts of the main video and the incentive video, and sets control where the videos are overlapped (geometrical information), when they are overlapped (synchronizing), which effects are used (e.g. alpha blending), and how to mix the audio of both streams. Even information for user interaction may be added, e.g. different ways to continue may be offered (e.g. "end playback" and "play again" and "go to next metadata set"). In this example, the main movie is finished after producing the masters for the optical disc. But, the content provider may later add additional information for this movie by using the metadata according to the invention, combining it with appropriate video sequences and making it available over his internet portal. Advantageously, the content provider may add interesting information about the movie via this feature at any time. The customers may become informed e.g. via a newsletter or direct email. So, stronger customer retention may be achieved.

Moviemakers use more and more computer aided shooting, i.e. the amount of artificial generated scenes in current movies grows strongly. Thus, it becomes continuously easier to generate difference video sequences. As another example, a user buys an optical disc with an erotic movie. However, most people shown in the movie wear clothes. After paying a fee, the user may download from the content provider's Internet portal special video sequence information, which provides the desired view. This special video sequence information (SVSI) contains a difference video sequence, which changes the appearance of the erotic movie, modified pixel per pixel. For playback, the playback device overlaps both video sequences according to the also delivered inventive metadata. The added difference video sequence changes the appearance of some pixels. In this example it removes appropriate clothes from some actors in some scenes. So, the customer gets a free view of more naked skin by paying additional fee to the content provider and downloading the difference video sequence from the Internet. The amount of visible skin may depend on the amount of paid fees. In a similar example, the clothes that the actors wear in a movie may be changed according to a current fashion by applying this feature, or the background (i.e. the virtual location) of a movie scene may be changed.

In a further example, a user buys an optical disc with a movie. Several actors play roles in this movie. The content provider separates the movie into the background scenes and the heads of the actors (as video sequence). Overlapping the background scene and the heads of the actors will perform the actual playback of the movie. The inventive metadata describe when which heads are overlapped with the background video at the right position inside the frame. It is used to control the overlapping process. Furthermore, the inventive metadata contains information about the displayed head, i.e. it's three-dimensional (3D) position and relative position to the camera, the lighting level and directions for the head, the physical environment (e.g. windy, under water, centrifugal forces), and so on.

The customer may want to exchange the actors. So, the user gives the playback engine appropriate information about the 3-dimensional head of the desired actor (e.g. the customer itself). This may be done by a scanning of the head, e.g. some electronic photos of the head and some software in the playback device, which generates an appropriate 3D model of the desired head. With some typical 3D engines (as used in current graphic accelerators) the playback device is able to generate in real-time the appropriate heads, which will be overlapped with the background video. Current 3D engines are even able to handle complex structures such as e.g. long hair in combination with wind. For first simple versions, it would be possible that the user scans the desired head and sends this information to the content provider. The content provider generates the overlapping video and sends this back to the user. The user applies this received sequence as described above.

However, the last example describes a method, wherein the content provider produces at first the video, separated in background video and heads. Additionally, the content provider provides metadata informing which head shall be displayed at which position. The content provider may also provide a 3D model of the actor and metadata informing the playback device how to generate the appropriate projection of this head.

The disc with this content are put onto the master, i.e. it is static content like the movie itself. Faces of other actors may be added to the disc (static information). Then the user may exchange the actors by using the content of the purchased disc. Furthermore, the content provider may offer other actors for this movie as bonus material by downloading from his Internet portal. Furthermore, the content provider may offer to put 3D models into the movie by receiving appropriate photos from a customer, which are sufficient to generate the required 3D model. That would be another business model. It is even possible that customers are able to exchange 3D models with other users.

So, the playback device of this example supports two ways of overlapping:
1) overlapping already projected video sequences with the background video (e.g. the original actor heads)
2) overlapping of projections which are calculated in real-time during playback based on a 3-dimensional model of an head. The additional metadata (e.g. position of the head and lighting information, and information about the physical environment etc.) is delivered by the content provider (may be already on the disc or may be delivered as bonus material via the Internet.

In a further example, the user generates an own menu to get an overview over available videos. The user produces metadata according to the invention, which describes where how many thumbnail videos are overlapped with a background movie. The user may also decide the behaviour of a selected thumbnail (for navigation) and the appearance of the thumbnail after activating. FIG. 4 describes the menu as developed for this example. The user generated a 3×3 thumbnail video menu with a background video. The selecting of a thumbnail (e.g. via navigation buttons Up, Down, Left, Right) scales up a little bit the selected video sequence as shown in FIG. 5. If the user activates this thumbnail (i.e. a final selection), then the thumbnail grows up until it covers the whole screen. Then the conventional playback may start.

In this example, the user itself produces the metadata defining where a video shall be located. In this case, the knowledge about the specific presented video and the menu structure does not need to be fixed, i.e. during generation of the menu it may be unclear which specific videos are presented at a special position in the menu, i.e. the overlapping is done by interpreting in real-time the stream information from the video stream itself (to get the format and the resolution etc.) and the geometrical information and information from the user's menu structure. So, these metadata are necessary, but usually separated. The content provider may provide some software and/or templates to generate such menus. The playback device may be able to support the generating of such menus.

The metadata according to the invention may be located differently.

Such metadata may be located on the same medium (e.g. HDD or optical disc, e.g. DVD, HD-DVD, or Blu-ray) as the overlapped video sequences. Generally, it may be located on the same medium as at least one of the overlapped video sequences.

The metadata may also be located on another medium as the overlapped video sequences.

Further, the metadata may be separately received from other sources (e.g. USB, flash memory, Internet, etc.).

Various possibilities for the mixing of the video sequences and the metadata exist:
  The metadata may be interleaved with the AV stream.
    This means that the content provider decides during authoring something or all about the overlapping of the videos.
    Technically, this may be done by storing the metadata e.g. inside the user_data( ) of MPEG-2 Video or MPEG-4 Video or VC-1 streams.
    Another alternative would be to store the metadata in separate transport packets of the transport stream (e.g. in the .m2ts files of BD content).
    However, this kind of metadata needs a special standard to become readable by different playback devices.
  The metadata may be stored in a separate file.
    That means that the metadata may be linked to the file after authoring of the video sequences. Such kind of metadata may be additional bonus material downloaded from the content provider's web page, as incentive for the users for visiting the content provider's web page or for a voluntary registration (to achieve customer loyalty and customer tracking), etc.
    Technically, storing the metadata in special files may do this.
    An alternative could be to store this metadata in other information files, e.g. in the Blu-ray's ".clpi" (ClipInfo) or ".mpls" (PlayList) files, or in the (HD-)DVD ".IFO" files.
    However, this kind of metadata needs a special standard to become readable by different playback devices.
  The metadata may be delivered together with the video stream (e.g. film director's "talking head") for a special movie, e.g. on a special disc. So, the delivery contains all necessary additional data for an overlapped playback.
  There may be different ways to overlap the identical video streams. So, more than one metadata set may be available for the same video sequences. They may be implicitly or explicitly prioritized, or the user may select the preferred metadata set.

Locations of the video sequences that shall be overlapped:
  Such video sequences may be located on the same medium (e.g. HDD or optical disc).
  Such video sequences may be located on different media. A simultaneous playback may be realized via a network.
  Video sequences may be separately received from other sources (e.g. USB, flash memory, Internet, etc.), e.g. as streamed video. E.g. the "film director" sequence comes directly from the content provider's Internet server (streaming) while the actual movie is read from an optical disc. The playback device overlaps both video sequences simultaneously by interpreting the metadata according to the invention.

Content of the Metadata:

The metadata describe how to overlap two or more video sequences on the same video screen. Advantageously, this overlapping may be possible in a broad range, i.e. very flexible. That means that the metadata contains information about e.g.

geometrical displaying metadata
    position inside the display
    scaling of the presented frames
        The possible scaling levels may be limited to a fixed set of values to simplify the realization of such a scaling, i.e. in order to simplify the hardware requirements.
    rotation before displaying
        The possible rotation levels may be limited to a fixed set of values to simplify the realization of such rotation, i.e. in order to reduce the hardware requirements.
    distortion (e.g. aspect ratio), if any
        overriding aspect ratios, e.g. the metadata constraints another aspect ratio than the video stream indicates
        flip the whole video horizontal and/or vertically
    frame crop information, if any
    overriding pixel aspect ratios, e.g. the metadata constraints another aspect ratio than the video stream indicates overlap timing metadata
    timing information and stream access points are used to synchronize the whole overlapping process. This may be video field, video frame or audio frame exact, or loosely synchronized
    if no specific timing information is available, then default values may be used instead.
    in general, timing information can describe a start time, end time, a duration or a mixture of any of these.
    information to navigate through a video sequence, like Program Chains (PGC) in DVD as published in the Internet under http://www dvd-replica co/DVD/pgca php
        (endless) loops, or stop after one completed presentation
    re-order parts of a video sequence for playback
    indicate possible user interactions (like PGCs)
    information to switch between different geometrical metadata and/or special effect metadata. May be video field or video frame or loosely synchronized.
    information can be provided in different precision levels
        loosely synchronized (i.e. usually on the order of a few frame periods)
        strictly synchronized (i.e. frame accurate or field accurate)
    information for the audio
        switching to an appropriate audio stream or
        indicate overlapping audio streams (indicate whether an audio stream shall be overlapped or not)
            Overlapping level (e.g. indicate which audio stream shall be put in the foreground or in the background).
            2D or 3D location (indicate the geometrical location from where the audio of a specific audio shall come/hearable)
        indicate volume level of each audio stream before mixing
        audio effects (e.g. add reverberation effect to the audio)
        if these audio behaviors are available, then they override the special effects for audio of the other metadata types.

Special effects metadata
    fade in/out
    color changes
    frame for the frame boundary
    indicating used overlapping method
        chroma keying information for transparency (color ranges will be mostly necessary because video compression may deliver diverse values inside the same transparency area)
        global transparency value for
            a single video sequence
            several video sequences
        adding sub-video to background video
        exclusive- or combining of sub-video with background video
    Different effects for different display types, e.g. transparency values depends on the used display type.
    Many other effects are possible
    Audio effects
        audio effects (e.g. add reverberation effect to the audio)

Stream metadata
    detailed technical information about a video sequence
        compression format (e.g. bitmap sequence, MPEG-2, MPEG-4, VC-1, etc.)
        resolution
        aspect ratio (for a frame and for a pixel)
        used color space (e.g. ITU 709 for HDTV or ITU 624 for SDTV, etc.)
        frame rate
        interlaced/progressive
        Chroma keying values, if any
        average or median values for the brightness
    detailed content information about a video sequence
        genre
        actors
        etc.
    audio properties
        indicate volume level of the audio stream
        2D or 3D location (indicate the geometrical location from where the audio of a specific audio shall come/hearable)
        indicate volume level of each audio stream before mixing If metadata are in the second sub-stream, i.e. to be overlaid to others, the following is to be considered. It may be located
a) in the video elementary stream (ES) (user_data( ), MPEG-2, MPEG-4 Video, VC-1)
b) in the transport stream (m2ts) in which the video ES is contained; probably also the Secondary Audio is contained in the same transport stream (TS)
c) in the ClipInfo File (clpi) of the corresponding TS
d) in the PlayList file (mpls)
e) as separate metadata file Examples for metadata contents/purpose
a) position (including frame exact modifying)
b) scaling (including dynamic or frame exact modifying)
c) selection from predefined fixed scaling factors
d) chroma keying information for transparency (NB: consider the color range because of compression)
e) global transparency value
f) transparency depending on display (display type g) color range information ITU-(T or R) 709 for HDTV; ITU 6?? for SDTV
h) overriding pixel aspect ratio information
i) flip information
j) rotation information
k) effects
l) frame for the PIPs (picture-in-picture)
m) start & stop information for asynchronous PIPs
n) base brightness, to achieve uniform/equable multi PIPs in attractive appearance
o) calculations on both pictures (e.g. raster operations) (e.g. subtract picture objects)

All metadata according to the invention may optionally also be able to modify the sub-video frame.

Further, all these metadata may be only for default values, i.e. they can be overwritten e.g. by BD-Java API calls. The above-mentioned metadata then degenerate to these default values.

Secondary Video is typically content that can be downloaded from the Internet and is then stored on local storage, so that the mix metadata are not necessarily stored on the optical disc (can be a ROM disc). It is also possible that primary and secondary video data are both on the same data carrier, e.g. optical ROM disc.

One exemplary application is that for a particular scene of a first video, e.g. expressed as start and end time stamps, the metadata according to the invention define which area of the display is relatively dark, and/or which area is relatively bright. This information may also be combined with prohibited or preferable areas for overlays, where this scene serves as background. If a second video shall be overlaid to this scene in a separate window, the second video contains metadata e.g. indicating that its contents is more bright, or indicating that its contents should be presented on a dark area, the window may be automatically positioned so as to meet all these requirements, i.e. it is automatically positioned on an area indicated as "dark". Moreover, if the background changes, the metadata of the first video indicate this change and the second, overlaid video may be automatically moved to another area, where all conditions are fulfilled. This move is preferably a smooth shift instead of a jump.

In another example, the first video stream is a game, e.g. synthetically rendered. Further video streams that provide e.g. different views that other characters in the game have may be overlaid. E.g. a player A has on his screen areas where the concurrent actions of other players B and C are shown. These other players may be human, e.g. in an online game, or virtual. Therefore, two other streams are overlaid to the background scene showing the players own view. The position of the overlay frames is defined by metadata that are attached to the respective streams. These metadata may also depend e.g. on the actions that the respective player performs.

In yet another example, the first video stream is a static image or a short scene that is continuously repeated, such as a background serving as menu. Several video streams are overlaid, corresponding e.g. to summaries of the videos that the user has in his video library. The first video stream has metadata attached that provide display areas to the video streams, so that 1. each video can be shown in an icon, 2. a defined number of video icons can be displayed, and 3. some space is left between the icons so that the background can be seen but each icon is as large as possible. E.g. the metadata define that twelve video streams are displayed in four columns and three rows, where each column has 25% of the width, each row has 33.3% of the height and each icon uses 80% of its width and height i.e. 81% of its area, so that on the remaining 10% on each edge the background is seen. In a similar example, the background should not be displayed, but independent from the number of available video streams each icon should have a maximum area on the screen. E.g. when there are two videos in the library, each of them gets half the display area. Generally, each of the videos gets the same share of the display (unto a certain minimum size), which is controlled dynamically by the metadata that are attached to the background.

As a particular advantage, the described relative type of area definition allows adaptation to every display size or resolution respectively.

The invention claimed is:

1. Method for overlaying two or more video streams dynamically as picture-in-picture, wherein metadata are associated to at least one of the video streams by playlist file, comprising
retrieving from a pre-recorded storage medium and displaying a first video stream, the first video stream being one of said video streams;
extracting said metadata from the playlist file of a second video stream, wherein the playlist file and the second video stream are retrieved from a local storage within a player, the local storage being different from the pre-recorded storage medium;
detecting that the extracted metadata defines how to overlay the second video stream to said first video stream, wherein said metadata contains at least scaling information and transparency information for the second video stream, time synchronization information, time stamps, and position data defining a display position and area for overlaying, and a reference to the first video stream, and said metadata further contains at least format information of at least the second video stream and projection information, wherein the projection information defines at least one of resolution and aspect ratio;
defining a 3-dimensional model;
calculating a projection of the 3-dimensional model according to said projection information;
including data of said projection of the 3-dimensional model into the second video stream; and
overlaying at least the second video stream to the first video stream as defined by said metadata, wherein the overlaying results in a portion of the first video stream being not visible.

2. Method according to claim 1, wherein said time synchronization information specifies a start time and an end time for overlaying the second video stream to the first video stream.

3. Method according to claim 1, wherein said display area is relative to the size of the display on which the second video stream is overlaid to the first video stream.

4. Method according to claim 1, wherein said metadata contain priorities for the position data, and wherein in the case of collisions the position data with the higher priority is applied.

5. Method according to claim 1, wherein said metadata further contain content information and/or audio properties of the video stream to which it is associated.

6. Method according to claim 1, wherein said metadata contain color range information, flip information and/or rotation information for the second video stream.

7. Method according to claim 1, wherein said metadata contain special effects data, for example fade in/fade out data, colour change data, frame data for a frame boundary or an indication of an overlapping method to be used.

8. Method according to claim 1, wherein said metadata define said transparency information data only for particular display types.

9. Method according to claim 1, wherein said metadata define said special effects data only for particular display types.

10. Method according to claim 1, wherein the second video stream contains difference video data that change the appearance of the first video stream on pixel level.

11. Method according to claim 1, wherein said metadata may be modified at presentation time.

12. Method according to claim 11, further comprising the steps of
   a. detecting that the second video stream is selected, and
   b. upon the detecting, automatically increasing the display area for the second video stream.

13. Method according to claim 1, wherein the metadata further contains special effects data, and wherein a hierarchy exists which defines that the time synchronization information controls the position data and the special effects metadata.

14. Method according to claim 1, wherein first metadata associated with the first video stream indicate a brightness level of a display area, and second metadata associated with the second video stream contain a brightness level indication of the second video stream, further comprising the step of
   automatically generating position information based on said brightness level of said display area of the first video stream and the brightness level indication of the second video stream, wherein the second video stream is overlaid to the first video stream according to the generated position information.

15. Method according to claim 1, wherein the pre-recorded storage medium is an optical disc.

16. A non-transitory storage medium having recorded thereon computer-executable instructions that when executed by a computer cause the computer to overlay two or more video streams dynamically as picture-in-picture, wherein metadata are associated to at least one of the video streams by a playlist file, the instructions, when executed by the computer:
   retrieve from a first storage medium a first video stream being one of said two or more video streams, and displaying the first video stream;
   extract said metadata from the playlist file of a second video stream, wherein the playlist file and the second video stream are retrieved from a local storage within a player, the local storage being different from the first storage medium;
   detect that the extracted metadata defines how to overlay the second video stream to said first video stream, wherein said metadata contains at least scaling information and transparency information for the second video stream, time synchronization information, time stamps, and position data defining a display position and area for overlaying, and a reference to the first video stream, and said metadata further contains at least projection information of at least the second video stream and projection information, wherein the projection information defines at least one of resolution and aspect ratio;
   define a 3-dimensional model;
   calculate a projection of the 3-dimensional model according to said projection information;
   including data of said projection of the 3-dimensional model into the second video stream; and
   overlay at least the second video stream to the first video stream as defined by said metadata, wherein the overlaying results in a portion of the first video stream being not visible.

* * * * *